(No Model.) 3 Sheets—Sheet 2.

D. M. OSBORNE.
GRAIN HARVESTING AND BINDING MACHINE.

No. 335,950. Patented Feb. 9, 1886.

Witnesses:
William H. Shipley
H. C. Huntsman

Inventor:
D. M. Osborne
By Phil. T. Dodge atty.

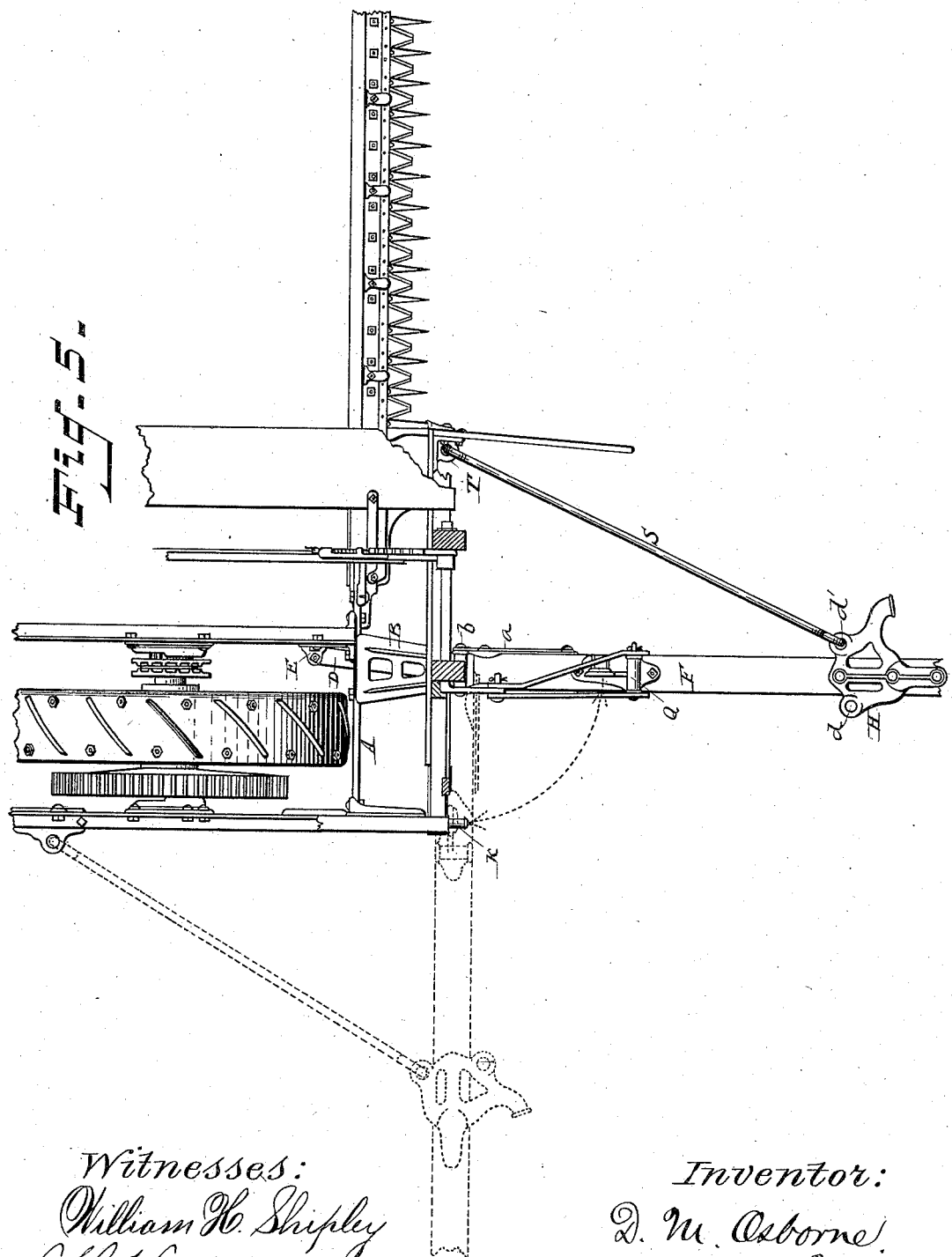

UNITED STATES PATENT OFFICE.

DAVID MUNSON OSBORNE, OF AUBURN, NEW YORK.

GRAIN HARVESTING AND BINDING MACHINE.

SPECIFICATION forming part of Letters Patent No. 335,950, dated February 9, 1886.

Application filed January 24, 1885. Serial No. 153,902. (No model.)

*To all whom it may concern:*

Be it known that I, DAVID MUNSON OSBORNE, of Auburn, in the county of Cayuga and State of New York, have invented certain Improvements in Grain Harvesting and Binding Machines, of which the following is a specification.

This invention has reference to those grain binding and harvesting machines in which provision is made for placing the draft-pole at right angles to its ordinary position when the machine is mounted on truck-wheels for transportation from place to place.

The object of the invention is to afford a ready and convenient mode of changing the position of the pole without detaching the same from the machine.

To this end it consists, essentially, in jointing or hinging the pole to the frame and combining therewith a means by which it may be secured in either of its two positions.

Figure 1:
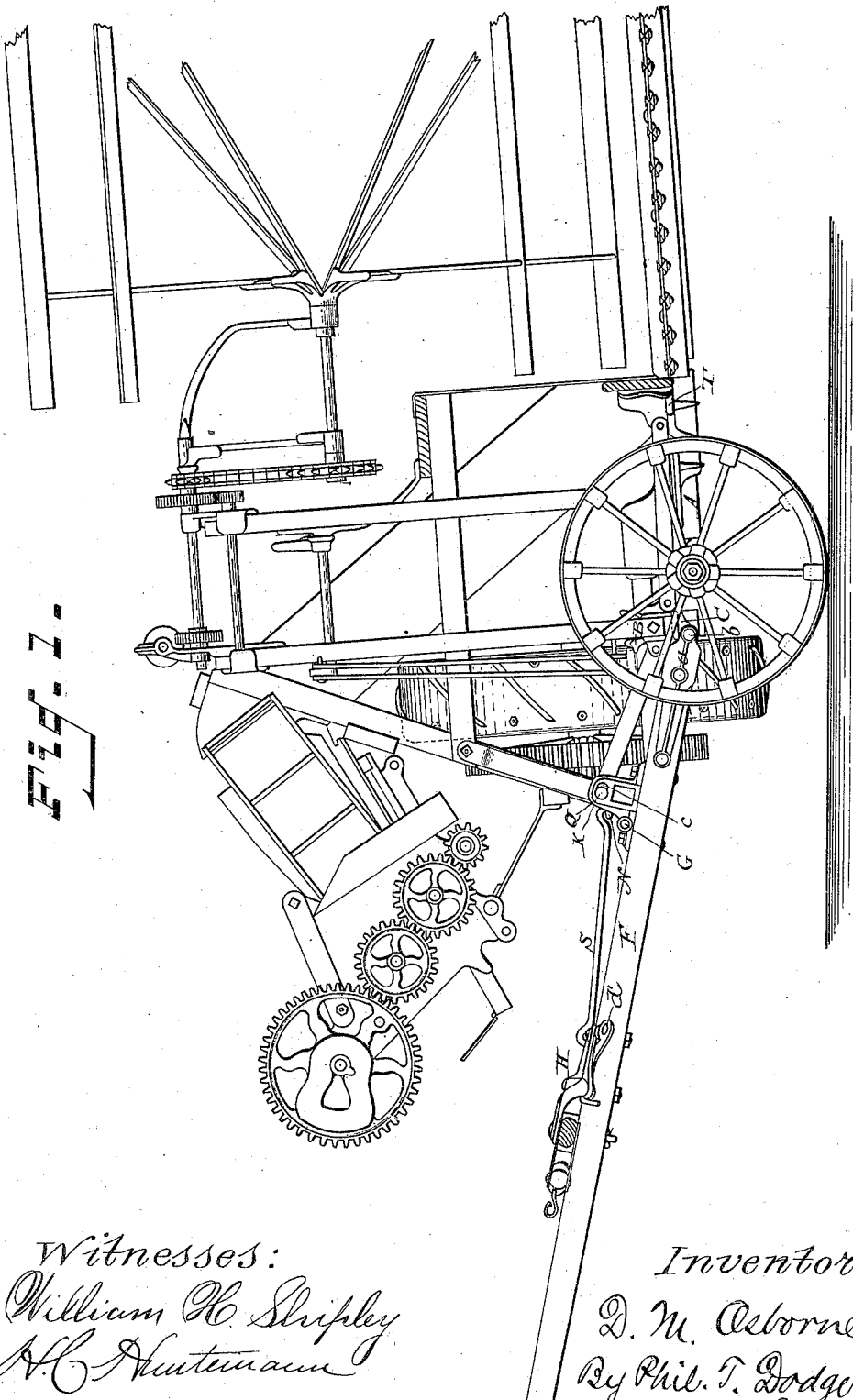
Figure 2:
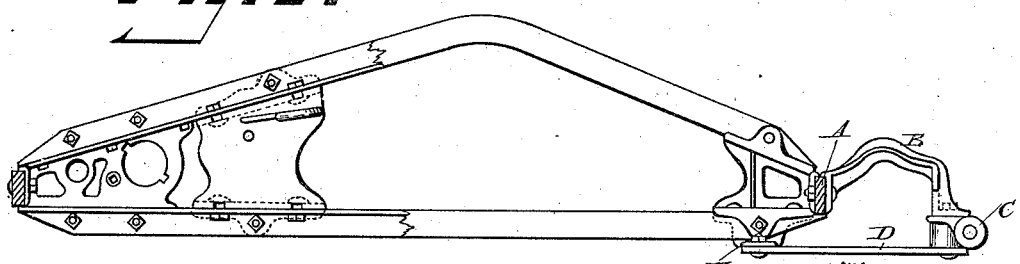
Figure 3:
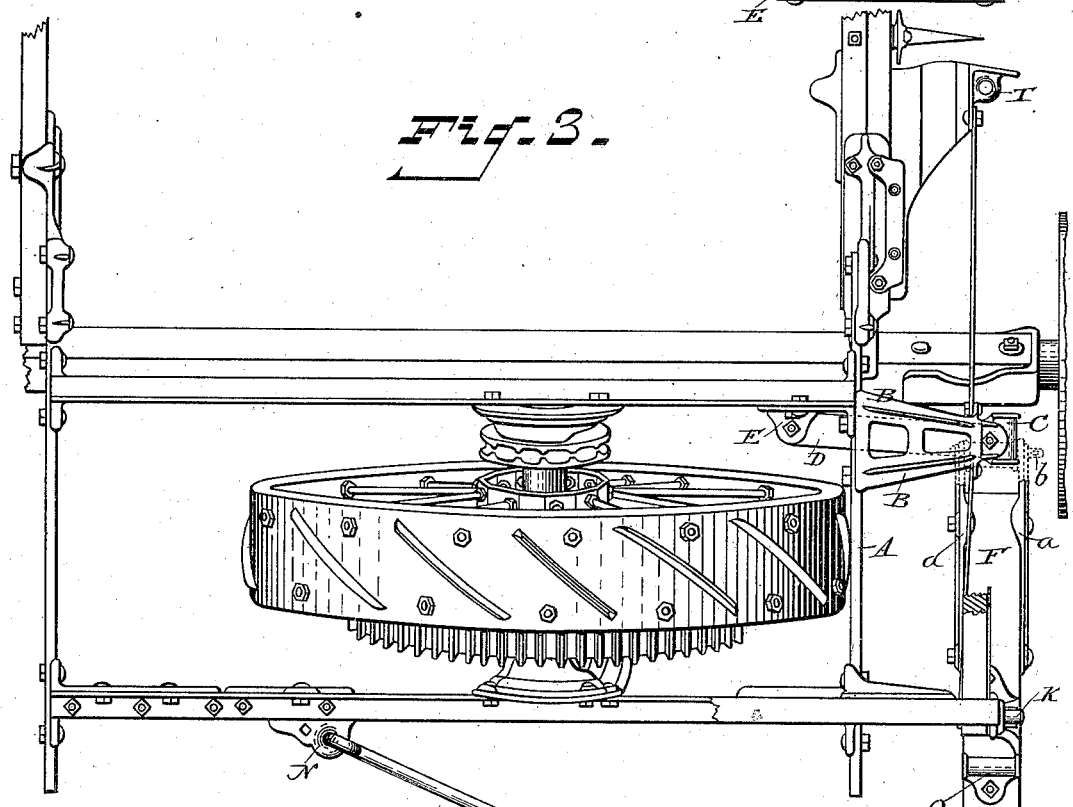
Figure 4:
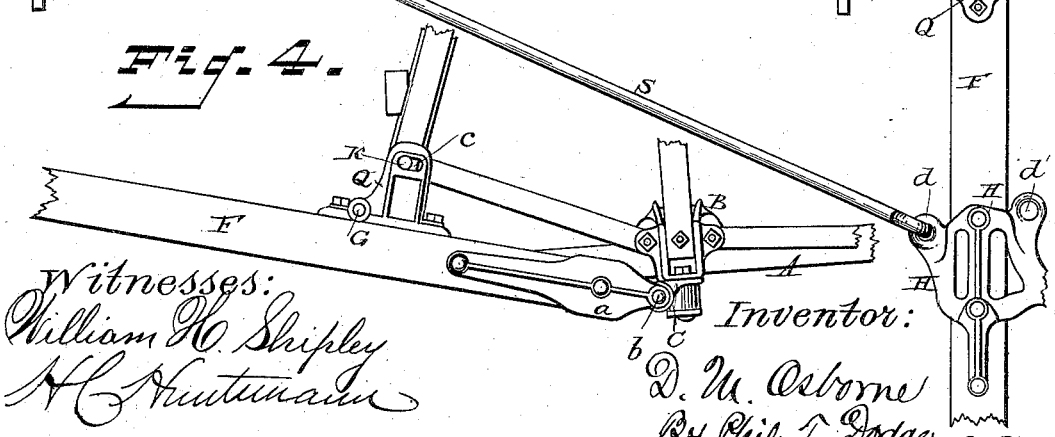

Figure 1 represents a front elevation of a self-binding harvester provided with my improvement, the machine being mounted on truck-wheels and the pole adjusted in position for transportation. Fig. 2 is a sectional elevation of the main frame inside of the main wheel. Fig. 3 is a top plan view of the frame of the harvester with the pole in the same position as in Fig. 1. Fig. 4 is an elevation of a portion of the frame-work, illustrating the manner in which the harvester is tilted for transportation and the hinge or swivel connection of the pole. Fig. 5 is a plan view of a portion of the front or cutting side of the harvester, with the pole in its normal position—that is to say, the position which it occupies when harvesting.

In the general form and construction of its parts the harvester may be of any known or approved form.

The drawings illustrate a form substantially such as is now in common use.

In applying my improvement I bolt to the front side of the harvester-frame A a casting, B, extending forward in an arched form and carrying at its forward end a block, C, swiveled or pivoted thereto so as to turn freely in a horizontal direction. To the bottom member of the inside frame I bolt a casting, E, to which a brace-bar, D, is bolted and extended forward to the under side of the swivel C, in order to assist in giving support thereto. To the rear end of the draft-pole F are bolted, on opposite sides, metal plates a, to receive the horizontal pivot b, by which the pole is connected to the swivel-plate C, before mentioned. It will be observed that this connection permits the pole to be turned through a horizontal arc of ninety degrees, so that it may be placed, as shown in Fig. 5, at right angles to the cutter-bar for action in the field, as usual, or turned to a position parallel to the cutter-bar, as indicated in Figs. 1 and 3, and in dotted lines in Fig. 5, for the purpose of drawing the machine endwise in the course of its transportation from place to place.

At a proper point on the upper side of the pole is bolted a casting, Q, having a double function. It is provided with a transverse eye or socket, G, to receive the pivot of the bars, by which the frame is tilted, as usual, and is also provided with an upwardly-projecting arm having a horizontal slot, c, to receive the pin or stud K, which is fixed on the side of the main frame-work in such position as to enter the slot when the tongue is in position for transporting the machine. This stud serves as a connection between the pole and frame to maintain the harvester in the inclined or tilted position in which it is placed for transportation. At a point still farther out on the upper side of the pole is bolted a plate, H, adapted to receive the evener or draft-tree, and provided on its two sides with projecting eyes d d', to receive the end of a brace-rod, S, as presently described. Near the rear of the main frame, on the stubble side, I secure a casting, N, provided with an outwardly-projecting eye, as shown, to receive one end of the brace S. The brace consists, as shown, of a strong rod provided with hooks at its two ends.

When the pole is in the transporting position, the brace is hooked at one end into the plate N, and at the opposite end into one of the eyes of the pole-plate H, in the manner plainly represented in Fig. 4, the pole being in this manner locked firmly in position against lateral motion with respect to the frame. On the main shoe I form or to any suitable portion of the frame near the shoe I attach an eye-plate, T.

When the pole is in its normal or harvesting position, the brace S is hooked at one end into this eye-plate T and at the opposite end into one of the eyes of the pole-plate H, thus holding the pole in position for harvesting. It will be observed that the movable brace thus serves to hold the pole firmly in either of its two positions at will.

When the machine is engaged at harvesting, the pole projects forward at right angles to the cutter-bar, being held against lateral motion by the brace applied as in Fig. 5.

When it is desired to transport the harvester from place to place, it is mounted on a truck or on truck-wheels, in accordance with any of the various methods now in vogue which will raise the main wheel clear of the ground. The tilting bars are then disconnected from the pole, the brace unhooked, and the pole turned to the position represented in Fig. 3, and the brace applied on its opposite side, care being taken to see that the stud K enters the slot in the plate J. The forward end of the pole being depressed, the harvester assumes the familiar inclined position with the grain-wheel lifted clear of the ground.

The essence of my invention lies in the pivotal connection of the tongue to the frame in such manner that it may be turned horizontally through an arc of not less than ninety degrees, and it will be manifest to the skilled mechanic that the details of the jointed connection may be modified without departing from the limits of my invention.

Although the brace constructed and arranged as described is considered the most simple and serviceable means of securing the tongue in its two positions, it is to be understood that the pivoted tongue may be used in connection with braces or locking devices otherwise arranged to secure it in position.

I am aware that it is old to attach the draft-pole of a mowing-machine to a swiveling caster-wheel so that it will control the course of the machine when in action. I am also aware that it has been proposed to connect the tongue of agricultural implements by a hinged joint so constructed that the tongue would swing automatically to one side as the course of the machine was changed in swinging corners, the construction being such that the tongue was locked in its single operative position by the draft of the team and that in all other positions it was free to vibrate, and to such construction I lay no claim.

I believe myself to be the first to provide a harvesting-machine with a horizontally-swinging tongue, and with means by which said tongue can be locked rigidly in position at right angles to or in line with the cutter-bar, according as the machine is to be drawn sidewise or endwise. I also believe myself to be the first to joint a tongue to a harvesting-machine in such manner that it may swing horizontally through an arc of ninety degrees, and also swing vertically to permit the tipping or tilting of the platform.

Having thus described my invention, what I claim is—

1. In combination with the frame of a grain binding and harvesting machine, a draft-pole pivotally attached thereto so that it may be placed at right angles to or parallel with the cutter-bar, and means, substantially as described, for locking said pole firmly in the one or the other of said positions at will, whereby the tongue may be employed for guiding the machine when in operation, and also when being drawn endwise.

2. In combination with the frame of a harvesting and binding machine, having detachable carrying or truck wheels at right angles to the main or road wheel, a draft-pole or tongue pivotally attached thereto so that it may be placed either at a right angle to or parallel with the cutter-bar and locking devices, substantially as described, to secure the pole rigidly in either of the two positions.

3. In combination with the harvester-frame and the horizontally-swinging pole pivoted thereto, the eye-plate on the pole, the two eye-plates on the frame, and the changeable braces adapted to connect the tongue with one or the other of said frame-plates, as described.

4. The harvester-frame, in combination with the tongue connected thereto by both horizontal and vertical pivots, substantially as described, means, substantially as described, for locking the tongue parallel with or at right angles to the cutter-bar, and adjustable devices connecting the tongue and frame to change the inclination of the latter.

5. In combination with the harvester-frame provided with the stud, the draft-pole provided with the slotted plate to engage the stud.

6. In combination with the main frame provided with the stud, the swinging pole jointed thereto, and the pole-plate provided with the slot to receive the stud, and with the eye to connect with the tilting devices.

In testimony whereof I hereunto set my hand this 11th day of January, 1885, in the presence of two attesting witnesses.

DAVID MUNSON OSBORNE.

Witnesses:
FRANK H. KEYES,
CLEMENS B. KASTERS.